Oct. 22, 1968   R. S. ROOT   3,406,801
SELF-ADJUSTING CLUTCH
Filed July 26, 1966
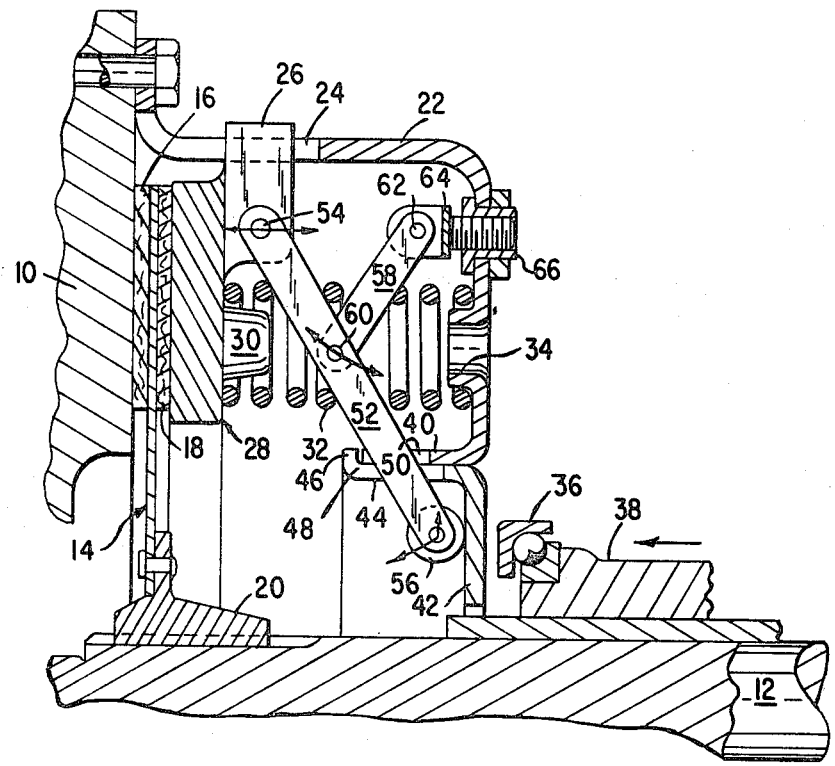
INVENTOR.
ROBERT S. ROOT.
BY John R. Varney
ATTORNEY.

3,406,801
SELF-ADJUSTING CLUTCH
Robert S. Root, Syracuse, N.Y., assignor to Lipe-Rollway Corporation, Syracuse, N.Y., a corporation of New York
Filed July 26, 1966, Ser. No. 568,028
1 Claim. (Cl. 192—99)

ABSTRACT OF THE DISCLOSURE

A self-adjusting, friction disc, clutch release, linkage mechanism including toggle links between the pressure plate and clutch cover and operable to continuously adjust as the friction disc is worn away through use to maintain a constant space between the clutch release bearing and the clutch release sleeve.

---

This invention relates to and has as an object a new and improved self-adjusting release mechanism for a friction type clutch.

In friction type clutches, a driving member, normally a fly wheel, transmits a drive through the clutch to a driven member, normally a transmission input shaft. In friction clutches the transmission of the drive through the clutch is accomplished through the clutch cover member which is fixedly bolted or otherwise secured to the fly wheel. The cover member drives a pressure plate which frictionally engages a friction disc between the pressure plate and the fly wheel. The friction disc is splined to the driven shaft and the clutch is urged by a plurality of spring members into driving engagement. When it is desired to disengage the driving connection, a clutch release bearing serves through a release mechanism to move the pressure plate away from the friction disc thereby disengaging the driving connection. In such clutches it is desirable to maintain a constant space between the clutch release member and the release mechanism so as to insure the same amount of clutch pedal release travel each time the pedal is operated throughout the life of the clutch. This gives rise to a problem, however, in that over the life of the clutch, the friction disc facings wear due to the frictional engagement with the fly wheel and the pressure plate, which wear is normally taken up by movement of the clutch release mechanism. Many types of self-adjusting clutch release mechanisms have been heretofore proposed, but all such proposals have been unsatisfactory for various reasons.

It is a more specific object thereof of this invention to provide an automatically self-adjusting clutch release mechanism comprising a new and improved linkage and wheel arrangement which functions to maintain a constant distance between the release mechanism and the release member.

In the drawings is shown a fragmentary, cross sectionally elevational view of the preferred embodiment of the invention.

The invention consists in the novel features and in the combinations and constructions hereinafter set forth and claimed.

In describing this invention, reference is had to the accompanying drawings in which like characters designate corresponding parts in all the views.

As shown in the drawings, the clutch mechanism comprising the preferred embodiment of the invention is utilized to clutch and declutch the driving connection between the driving member which may be a fly wheel and a driven member, which for example may be an input transmission shaft. Splined to the shaft 12 is a friction disc 14 which is provided on its opposite side with friction material 16 and 18, respectively. The disc 14 is affixed to a hub 20 which is complementarily splined to permit its mounting on the shaft 12 for rotation therewith. The clutch includes a cover member 22 apertured as at 24 in a plurality of circumferentially spaced locations to permit the passage therethrough of driving lugs 26 formed on the clutch pressure plate 28.

The pressure plate 28 is also formed with upstanding bosses 30 which receive the inner end of compression springs 32 which are received at their outer ends about inwardly extending bosses 34 formed in the cover plate 22. The springs 32 normally urge the pressure plate 28 inwardly or to the left as seen in the drawings to grip the friction facings 16 and 18 on the disc 14 between the pressure plate 28 and the driven member 10 so as to provide a driving connection through the clutch to the driven shaft 12.

The clutch release mechanism which comprises the novel portion of this invention relates to a self-adjusting release mechanism and comprises a release bearing 36 mounted on a release bearing carrier 38 for movement in the direction of the arrow as shown in the drawings to effect the release or declutching of the clutch mechanism. Cover member 22 is formed with an inwardly turned sleeve 40 in which is received a generally cup-shaped member 42, having an upstanding sleeve 44 and terminating in an outwardly extending lip 46. The cup member 42 slides within the sleeve 40 formed on the cover member and is provided with an aperture 48 which is aligned with an aperture 50 formed in the flange 40 of the cover 22. The cup member 42 is received for sliding movement in the flange 40 of the cover member 22 in any suitable manner for rotation therewith. Extending through the aligned apertures 48 and 50 is a link member 52 pivotally attached at its outer end as at 54 to the lug 26. The inner end of the link 52 has a wheel or roller 56 received therein and the wheel 56 rolls in an axial direction toward and away from the shaft 12 upon the inner surface of the cup member 42 upon operation of the release mechanism.

A second link member 58 is pivotally connected to the link 52 intermediate its end as at 60 and the opposite end of the link 58 is pivotally connected as at 62 to an eye bolt 64 which is threadedly connected to a nut 66 carried in an aperture formed in the cover 22.

In operation, when the clutch pedal linkage mechanism is operated (not shown) to declutch the normally engaged driving connection, the release bearing 38 moves in the direction of the arrow causing the roller bearing 36 to engage the cup member 42, moving it to the left as shown in the drawings. The roller 36 rolls downwardly along the inner surface of member 42 and by virtue of the pivotal connection with the link 58 moves the pressure plate to the right as viewed in the drawings to disengage the frictional engagement of the friction disc 14 and the driven member 10. As wear takes place on the friction facings 16 and 18, the compression springs 32 take-up said wear by moving the pressure plate 28 to the left as viewed in the drawings, this results in the link member 52 moving in a counterclockwise direction about its pivotal connection to the link 58 and moving the starting point of contact of the roller 56 upwardly along the inner surface of the cup member 42.

The aperture 50 and the flange 40 or cover members 22 and 48 in the wall 44 of the cover member 22 are formed of sufficient size to permit such movement of the link 52 due to wear of the friction facing. The outward movement of the cup member 42 under the influence of the spring 32 is halted by the engagement of the lip 46 formed on the cup member 42 and the inner edge of the flange 40 on the cover member 42 so that the space between the cup member 42 and the release bearing 36 is maintained at a constant predetermined amount.

What I claim is:

1. A self-adjusting linkage release mechanism for a friction type clutch having a driving member and a driven member and at least one friction disc frictionally engaged and providing a driving connection therebetween, said clutch including a pressure plate normally urged into frictional engagement with said friction disc and a pressure plate release linkage mechanism comprising an angularly disposed first link member pivotally connected at one end to said pressure plate and having a roller member affixed to its opposite end, said roller being received in a release member and mounted therein for oscillating movement upon movement of said release member in said cover member, a second link member pivotally connected to said first link member intermediate its ends, said second link member being pivotally connected at its opposite end to said cover member, means for adjusting the connection between the outer end of said second link and said cover member said second link being operable to maintain said roller on said first link in engagement with said release member, said link members moving about their pivotal connections in response to wear of said friction disc to maintain a constant position of said release member.

References Cited

UNITED STATES PATENTS

| | | | |
|---|---|---|---|
| 1,697,904 | 1/1929 | Coffman et al. | 192—68 |
| 2,277,273 | 3/1942 | Spase. | |
| 2,682,943 | 7/1954 | Root. | |

BENJAMIN W. WYCHE III, *Primary Examiner.*